(12) United States Patent
Poelker

(10) Patent No.: US 9,340,725 B2
(45) Date of Patent: May 17, 2016

(54) USE OF A BTEX-FREE SOLVENT TO PREPARE STIMULATION AND OILFIELD PRODUCTION ADDITIVES

(75) Inventor: David J. Poelker, Missouri City, TX (US)

(73) Assignee: Baker Hughes Incorporated, Houston, TX (US)

( * ) Notice: Subject to any disclaimer, the term of this patent is extended or adjusted under 35 U.S.C. 154(b) by 752 days.

(21) Appl. No.: 13/213,936

(22) Filed: Aug. 19, 2011

(65) Prior Publication Data

US 2013/0046048 A1    Feb. 21, 2013

(51) Int. Cl.
| C08K 5/10 | (2006.01) |
| C09K 8/60 | (2006.01) |
| C08K 5/107 | (2006.01) |

(52) U.S. Cl.
CPC .......... *C09K 8/602* (2013.01); *C08K 5/107* (2013.01); *C09K 2208/32* (2013.01)

(58) Field of Classification Search
CPC ........................................... C08K 5/107
USPC ........................................... 524/317
See application file for complete search history.

(56) References Cited

U.S. PATENT DOCUMENTS

| 2,698,279 | A | * | 12/1954 | Mondria | 208/29 |
| 3,278,637 | A | * | 10/1966 | Kirkpatrick et al. | 525/496 |
| 4,097,463 | A | * | 6/1978 | Culbertson | 528/138 |
| 4,117,031 | A | * | 9/1978 | Macenka et al. | 525/507 |
| 4,268,657 | A | * | 5/1981 | Manzara | 528/155 |
| 4,400,553 | A | * | 8/1983 | Aneja | 568/724 |
| 4,814,094 | A | | 3/1989 | Blair, Jr. et al. | |
| 4,814,394 | A | * | 3/1989 | Barthold et al. | 525/405 |
| 4,935,102 | A | * | 6/1990 | Berg | 203/58 |
| 5,089,589 | A | * | 2/1992 | Hesse et al. | 528/129 |
| 5,098,605 | A | * | 3/1992 | Buriks et al. | 516/181 |
| 5,420,274 | A | * | 5/1995 | Grace et al. | 544/213 |
| 5,423,955 | A | * | 6/1995 | Berg | 203/68 |
| 5,628,906 | A | * | 5/1997 | Shinnar | B01D 11/0492 210/259 |
| 7,713,315 | B2 | | 5/2010 | Krull et al. | |
| 2010/0025290 | A1 | | 2/2010 | Feustel et al. | |
| 2010/0099800 | A1 | | 4/2010 | Ueno et al. | |

* cited by examiner

*Primary Examiner* — Jane L Stanley
(74) *Attorney, Agent, or Firm* — Mossman, Kumar and Tyler, PC

(57) ABSTRACT

Preparing a demulsifier, an oil soluble imidazoline corrosion inhibitor, an alkylphenolic resin, an alkylphenolic resin oxyalkylate, a paraffin inhibitor, a defoamer, an oil soluble scavenger, an oil soluble cleaner, a wetting agent, a surfactant, a foamer, and combinations thereof, in a non-limiting embodiment, in the absence of a BTEX solvent would be more beneficial to the environment than the same products prepared with BTEX solvent(s). The method may include adding an organic solvent to a mixture to form the aforementioned material(s). The organic solvent may be or include propylene glycol methyl ether acetate (PGMEA currently marketed as DOWANOL PMA™), dipropylene glycol methyl ether acetate (currently marketed as DOWANOL DPMA™), diisobutyl ketone (DIBK), methyl isobutylketone (MIBK), and mixtures thereof.

9 Claims, 1 Drawing Sheet

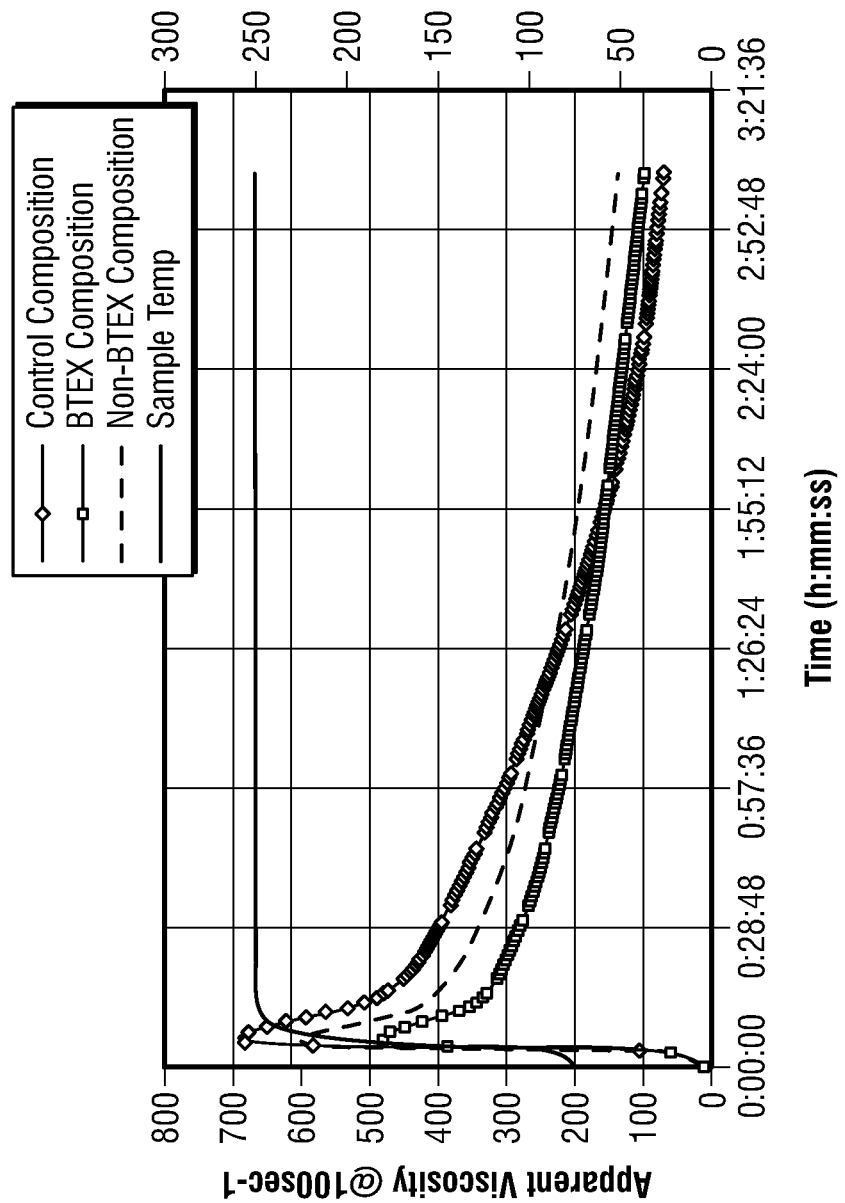

USE OF A BTEX-FREE SOLVENT TO PREPARE STIMULATION AND OILFIELD PRODUCTION ADDITIVES

TECHNICAL FIELD

The present invention relates to a method of preparing a material in the absence of a BTEX solvent where a non-BTEX organic solvent is added to a reaction mixture and subsequently forms a material that may include oil soluble demulsifiers, an oil soluble imidazoline corrosion inhibitor, an oil soluble alkylphenolic resin, a paraffin inhibitor, a defoamer, an oil soluble scavenger, an oil soluble cleaner, a hydrotropic wetting agent, an oil soluble surfactant, a foamer, and combinations thereof.

BACKGROUND

Benzene, toluene, ethylbenzene, and xylene are all solvents that are commonly referred to as BTEX solvents. An aromatic hydrocarbon solvent, such as a BTEX solvent, allows for azeotropic distillation prior to the formation of a final product, such as a non-emulsifying agent in a non-limiting example. An azeotrope is a mixture of two or more liquids where the total composition of the mixture cannot be changed by simple distillation, i.e. boiling the liquid mixture produces a vapor having the same ratio of liquid components as that of the liquid mixture. Therefore, azeotropic distillation is a technique applied to change the ratio of components within an azeotrope. One specific technique may include adding another component or solvent to the liquid mixture, so that a new azeotrope with a lower boiling point is produced. A common example of this is done by adding benzene, a BTEX solvent, to water and ethanol to dehydrate the ethanol/water mixture. When the BTEX solvent is added to the mixture, the molecular interactions change and a new lower boiling azeotrope is formed. In actual practice the BTEX solvent produces water and an immiscible organic phase.

BTEX solvents have attracted much attention in recent years because these solvents tend to contaminate groundwater reservoirs, which poses serious health concerns for the public. BTEX solvents are considered strong carcinogens and are highly mobile in the soil and groundwater environment. This well-founded concern lies in the constant use of these solvents in areas including fuel operations, refineries, gasoline stations, and gasification sites. Thus, the use of BTEX solvents has declined.

BTEX solvents are toxic to humans, and diminishing the use of these solvents is of special interest. It would be desirable if a method were devised for preparing non-emulsifying agents, oil soluble imidazoline corrosion inhibitors, oil soluble alkylphenolic resins, paraffin inhibitors, defoamers, oil soluble scavengers, oil soluble cleaners, hydrotropic wetting agents, oil soluble surfactants, foamers and the like in a manner that is less harmful to the environment.

SUMMARY

There is provided, in one form, a method for preparing a material in the absence of a BTEX solvent. An organic solvent may be added to a mixture where the organic solvent may include propylene glycol methyl ether acetate (PGMEA currently marketed as DOWANOL PMA™), dipropylene glycol methyl ether acetate (currently marketed as DOWANOL DPMA™), diisobutyl ketone (DIBK), methyl isobutylketone, and mixtures thereof. In a non-limiting embodiment, the organic solvent may be added to the mixture in an amount ranging from about 50 v/v % independently to about 60 v/v % based on the total mixture. The method may further include forming a material from the mixture where the formed material may be or include oil soluble demulsifiers, an oil soluble imidazoline corrosion inhibitor, an oil soluble alkylphenolic resin, a paraffin inhibitor, a defoamer, an oil soluble scavenger, an oil soluble cleaner, a hydrotropic wetting agent, an oil soluble surfactant, a foamer, and combinations thereof.

In an alternative embodiment, the method may additionally include an intermediate step that requires azeotropic distillation from the mixture prior to the forming of the material therefrom.

The non-BTEX solvents appear to produce comparable products as those products made by using a BTEX solvent, but lessen the environmental effect that typically occurs by the use of benzene, toluene, ethylbenzene, or xylene.

BRIEF DESCRIPTION OF THE DRAWINGS

FIG. 1 is a graph of the apparent viscosity of various fluids over time, which illustrates the comparable non-emulsification results and lack of change in viscosity using the product produced from a BTEX solvent and a non-BTEX solvent.

DETAILED DESCRIPTION

It has been discovered that non-emulsifying agents can be prepared in the absence of a benzene, a toluene, an ethylbenzene, or a xylene (BTEX) solvent. This method is much less harmful to the environment than methods using BTEX solvents.

In lieu of using one or more of the BTEX solvents, propylene glycol methyl ether acetate (PGMEA currently marketed as DOWANOL PMA™), dipropylene glycol methyl ether acetate (currently marketed as DOWANOL DPMA™), diisobutyl ketone (DIBK), methyisobutyl ketone, and mixtures thereof may be used to form a comparable product or material from a reaction mixture as would be similarly produced by using one or more BTEX solvents. The formed material may include a demulsifier, an oil soluble imidazoline corrosion inhibitor, an alkylphenolic resin, paraffin inhibitors, defoamers, oil soluble scavengers, oil soluble cleaners, wetting agents, surfactants, foamers, and combinations thereof. The demulsifier may be or include, but is not necessarily limited to a resin oxyalkylate, a diepoxide, an amine oxyalkylate, a polyol ester, a sulfonate, and combinations thereof.

In a non-limiting embodiment, the method may include forming a mixture. The mixture may have or include an alkyl phenol, such as a butyl phenol in a non-limiting embodiment, and formaldehyde. These components may be added to a vessel in an amount ranging from about 20 wt % independently to about 60 wt %, or alternatively from about 30 wt % independently to about 40 wt % of the total mixture. The mixture may include from about 45 wt % to about 55 wt % DIBK and from about 35 wt % to about 40 wt % alkyl phenol and formaldehyde.

The reaction mixture may further include the addition of an acid or base catalyst. Dodecylbenzenesulfonic acid (DDBSA), in one non-limiting embodiment, may be used in an amount ranging from about 0.50 wt % independently to about 5 wt %, or alternatively from about 1 wt % to about 2 wt % of the total mixture. As used herein with respect to a range, "independently" means that any lower threshold may be used together with any upper threshold to give a suitable alternative range.

The alkylphenolic resin may be prepared by gradually increasing the temperature to about 135-140° C., while water is removed to effect condensation polymerization of the alkylphenolic resin. DIBK was found to azeotrope water in the same temperature range as the typical BTEX solvent. Water may be removed from the reaction vessel to form a typical alkylphenolic resin. The alkylphenolic resin formed by this process meets the same process specifications as one created by a BTEX solvent.

The above alkylphenolic resin may be further reacted with an alkylene oxide in the reaction mixture that is typically base catalyzed. The addition of a 25% methanolic potassium hydroxide (KOH) solution may be added to the reaction mixture in an amount ranging from about 0.50 wt % independently to about 5 wt %, or alternatively from about 1 wt % independently to about 2 wt % of the total mixture.

After the addition of the 25% methanolic KOH, the method may include a dehydration of the mixture, which may occur at a temperature ranging from about 250 F to about 275 F, or from about 250 F to about 260 F. The azeotropic removal of solvent and water may occur until the percent water remaining from the intermediate resin is less than 0.2% as represented by a Karl Fischer titration.

Following the dehydration, a mixed oxide may be added to the dehydrated mixture. The mixed oxide may include, but is not necessarily limited to a propylene oxide, an ethylene oxide, a butylene oxide, and combinations thereof, typically a mixture of ethylene oxide and propylene oxide. The mixed oxide may be added to the dehydrated mixture in an amount ranging from about 3 wt % to about 30 wt %, or alternatively from about 5 wt % to about 14 wt % of the total mixture. In a non-limiting embodiment, a propylene oxide may be added to the dehydrated mixture followed by ethylene oxide added to the mixture.

The mixed oxide may be added to the vessel at an approximate rate of about 5 lb/min independently to about 10 lb/min, or approximately 7 lb/min in an alternative embodiment. The mixed oxide may be added to the dehydrated mixture when the temperature of the vessel ranges from about 250 F independently to about 275 F, or alternatively from about 257 F independently to about 266 F. The pressure of the vessel may range from about 50 PSIG independently to about 70 PSIG, or from about 60 PSIG independently to about 70 PSIG in another non-limiting embodiment. The temperature and pressure may be held constant for about an hour, or long enough for the mixed oxide to completely react.

The method may further include adding a non-BTEX solvent, which may include but is not necessarily limited to propylene glycol methyl ether acetate (PGMEA currently marketed as DOWANOL PMA™), dipropylene glycol methyl ether acetate (currently marketed as DOWANOL DPMA™), diisobutyl ketone (DIBK), methylisobutyl ketone, and mixtures thereof. The non-BTEX solvent may be non-ionic, which allows for any eventual necessary separations to occur when it is part of a non-emulsifier formulation, even when iron impurities are present.

In one non-limiting embodiment, the non-BTEX solvent may be added to the vessel in an amount ranging from about 50 v/v % independently to about 60 v/v % based on the initial mixture, which corresponds to 5 v/v % independently to about 10 v/v % of the final blended product. Typically plant intermediates are 50% active and then diluted down to yield 20% field strength non-emulsifier products. The mixture may be stirred for a time period from about 20 minutes independently to about 60 minutes, or alternatively from about 30 minutes independently to about 40 minutes.

The forming of the material from the reaction mixture may occur at a temperature ranging from about 100 C independently to about 150 C, or alternatively from about 125 C independently to about 140 C; the temperature need only be sufficient to react the components of the mixture and subsequently drive off water. The forming of the material may occur at a pressure ranging from about 20 psig independently to about 50 psig for the resin, or alternatively from about 35 psig independently to about 45 psig.

The formed material, such as an alkylphenolic resin oxyalkylate in a non-limiting embodiment, may include a phenolic resin moiety from about 30 wt % independently to about 50 wt % of the total material. In a non-limiting example, the formed material may have about 15 phenolic groups if a 2500 g number average molecular weight sample of alkylphenolic resin product is produced. The formed material may have a number average molecular weight of about 2500 g independently to about 3000 g.

The above resin is usually oxyalkylated with ethylene, and or propylene oxide to produce the actual non-emulsifier product.

The invention will be further described with respect to the following Examples which are not meant to limit the invention, but rather to further illustrate the various embodiments.

EXAMPLE 1

| Butylphenolic Compounds | % of Mixed Oxide based on BTEX resin | RSN* |
|---|---|---|
| A | 80 | 10 |
| B | 90 | 10.7 |
| C | 100 | 11.1 |
| D | 110 | 11.5 |
| E | 120 | 11.9 |
| BTEX Compound (Control) | 100 | 10.3 |

*The RSN for each compound and each example was obtained by doing an RSN titration, which provides an approximate measure of a demulsifier's water solubility.

A plurality of butylphenolic resin mixed (ethylene oxide+ propylene oxide) oxyalkylates were produced using a non-BTEX solvent (DIBK) by the methods described above.

The butylphenolic resins were comparable to the butylphenolic resins obtained from similar methods using BTEX solvents as illustrated by the chart above.

The butylphenolic compounds (A-E) were made with varying amounts of mixed oxide. The % of mixed oxide is a ratio comparing the amount of mixed oxide used for each compound A-E to that of the BTEX resin, e.g. 80% of mixed oxide compared to the amount used for the BTEX resin was used to produce Butylphenolic Compound A.

Increasing the amount of mixed oxide for the resin product increases the relative solubility number (RSN). The RSN also suggests that a smaller amount of mixed oxide may be used to obtain a comparable butylphenolic resin to that of the BTEX resin, perhaps due to less solvent incorporation compared to a BTEX process. Solvent incorporation tends to lower the RSN value.

EXAMPLE 2

A butylphenolic resin was prepared by methods described above by using DOWANOL PMA™ as the non-BTEX solvent (an ester). Two acid catalysts, dodecyl benzene sulfonic acid (DDBSA) and p-toluenesulfonic acid, were tried but both caused acid gas carryover into the azeotropic distillate during the last step of resin preparation. This acidic carryover led to a low pH that interfered with the organic/water phase separation. The DDBSA catalyzed reaction was heated to remove a theoretical amount of one phase distillate (combined water and DOWANOL PMA™) and then reacted with ethylene oxide to produce an oxyalkylate from the above described alkylphenolic resin. Subsequent analysis still showed residual 7% Dowanol PMA present. Roughly 15% more mixed oxide was required for example 2 as compared to the same products of example 1. Water consumed some of the added oxide formed as part of the ester hydrolysis of the DOWANOL PMA™ and subsequent neutralization with the DDBSA catalyst and thereby produced the same polyol, as well as another lower molecular weight polyglycol.

the nonylphenolic resins, the same amount of mixed oxide must be used to obtain a comparable product to that of the BTEX product based on the RSN.

| Nonylphenolic Compound | | 5 min | 10 min | 20 min | 30 min | Final for 100% (min) | Sludge |
|---|---|---|---|---|---|---|---|
| BTEX Control (2GPT) | Unspent | 10% | 22% | 84% | 100% | | None |
| | Spent | 2% | 12% | 24% | 100% | | None |
| A (1GPT) | Unspent | 4% | 8% | 10% | 58% | 120 | None |
| | Spent | | | | | | |
| A (2GPT) | Unspent | 2% | 4% | 10% | 40% | 240 | None |
| | Spent | | | | | | |
| A (3GPT) | Unspent | 1% | 2% | 8% | 28% | 120 | None |
| | Spent | | | | | | |
| B | | Not tested | | | | | |
| C (1GPT) | Unspent | 4% | 8% | 18% | 96% | 60 | None |
| | Spent | 2% | 10% | 28% | 100% | | |
| C (1GPT) using corrosion inhibitor #27 not #31 | Unspent | 4% | 8% | 12% | 96% | 60 | None |
| | Spent | 4% | 12% | 26% | 100% | 60 | None |
| C (2GPT) | Unspent | 4% | 4% | 10% | 80% | 120 | None |
| | Spent | | | | | | |
| C (3GPT) | Unspent | 4% | 8% | 16% | 64% | 240 | None |
| | Spent | | | | | | |
| C (3GPT)) using corrosion inhibitor #27 not #31 | Unspent | 4% | 8% | 16% | 64% | 240 | None |
| | Spent | | | | | | |
| D (1GPT) | Unspent | 2% | 10% | 10% | 82% | 90 | None |
| | Spent | | | | | | |
| D (2GPT) | Unspent | 2% | 8% | 12% | 80% | 90 | None |
| | Spent | | | | | | |
| E(1GPT) | Unspent | 4% | 10% | 24% | 86% | 120 | None |
| | Spent | | | | | | |
| E(2GPT) | Unspent | 4 | 10 | 16% | 80% | 120 | None |
| | Spent | | | | | | |
| E(3GPT) | Unspent | 2% | 8% | 18 | 7% | 120 | None |
| | Spent | | | | | | |

EXAMPLE 3

Mixed oxide nonylphenolic resins (ethylene oxide+propylene oxide) were prepared using a non-BTEX solvent by the methods described above.

| Nonylphenolic Compounds | % of Mixed Oxide based on BTEX resin | RSN* |
|---|---|---|
| A | 80 | 11.1 |
| B | 90 | 12.2 |
| C | 100 | 13.5 |
| D | 110 | 14.3 |
| E | 120 | 14.6 |
| BTEX compound (control) | 100 | 14.9 |

The nonylphenolic compounds A-E were made with varying amounts of mixed oxide. The % of mixed oxide is a ratio comparing the amount of mixed oxide used for each compound (A-E) to that of the BTEX resin, e.g. 80% of mixed oxide compared to the amount used for the BTEX resin was used to produce Nonylphenolic Compound A. As in Example 1, increasing the amount of mixed oxide for the resin product increases the relative solubility number (RSN). However, for All of the nonylphenolic compounds (A-E) above were also analyzed by an oil and aqueous phase compatibility test. Nonylphenolic compounds A-E were diluted with isopropanol and blended with a polyol. All tests were conducted with 3750 ppm ferrous (2+) and 1250 ferric (3+) iron. The aqueous phase consisted of 15% hydrochloric acid, 4 GPT anti-sludge iron control agent, a non emulsifier and 1 GPT corrosion inhibitor #31. The API gravity of the oil was 30.8 corrected to 60° F.

"Spent" is a term well known to those skilled in the art of using non-emulsifiers. "Spent" as used herein means the particular test was run in a high pH environment, such as but not limited to a 'spent' HCl acid. The acid and additives were reacted with Calcium carbonate, until spent. The spent acid was then used to run an emulsion test. "Unspent" as used herein means the particular test was run in a lower pH, such as HCl acid of about 15-28% of the bulk fluid. The unspent acid was then used to run an emulsion test. Here, the data suggests that the nonylphenolic compounds A-E work in a low pH environment, such as but not limited to below 0, or in a high pH environment, such as but not limited to 10.

The performance of nonylphenolic compound C is also depicted in FIG. 1. FIG. 1 illustrates the compatibility of the nonylphenolic compound C when used in conjunction with a fluid system having a thermothickener polymer and surfactant composition as described by patent application Ser. No. 12/371,395, which is incorporated herein by reference. The Greeley City water (from Greeley City, Colo.) was the control, and the curve indicates that this was the highest viscosity for this example, and thus an emulsion in the spent acid completion fluid. The BTEX control, which contains 40-70% methanol, 5-10% 2-ethylhexanol, 5-10% isopropanol, 1-5% ethoxylated alcohol, and 5-10% heavy aromatic naphtha (a BTEX solvent) and alkylphenolic oxyalkylated resin had the lowest viscosity over time. Thus, the experimental (non-BTEX solvent) had a viscosity over time comparable with the BTEX control. All three samples, i.e. the control, the BTEX solvent, and the non-BTEX solvent that were tested contained 50 gpt of a thermogelling polymer, and 30 gpt of a non-ionic surfactant blend where gpt is defined as 'gallons per thousand'.

In the foregoing specification, the invention has been described with reference to specific embodiments thereof, and has been described as effective in providing methods and compositions for preparing a material, such as but not limited to demulsifying agents, in the absence of a BTEX solvents. However, it will be evident that various modifications and changes can be made thereto without departing from the broader spirit or scope of the invention as set forth in the appended claims. Accordingly, the specification is to be regarded in an illustrative rather than a restrictive sense. For example, specific organic solvents, reactants or materials that may be used or formed falling within the claimed parameters, but not specifically identified or tried in a particular method, are expected to be within the scope of this invention.

The present invention may suitably comprise, consist or consist essentially of the elements disclosed and may be practiced in the absence of an element not disclosed. For instance, the method may consist of or consist essentially of a method that may include adding a non-BTEX solvent to a mixture and forming a material therefrom where the formed material may include a demulsifier, an oil soluble imidazoline corrosion inhibitor, an alkylphenolic resin, a paraffin inhibitor, a defoamer, an oil soluble scavenger, an oil soluble cleaner, a wetting agent, a surfactant, a foamer, and combinations thereof.

The words "comprising" and "comprises" as used throughout the claims, are to be interpreted to mean "including but not limited to" and "includes but not limited to", respectively.

What is claimed is:

1. A method comprising performing an azeotropic distillation, wherein the azeotropic distillation comprises:
   adding an organic solvent to an azeotropic mixture comprising an alkyl phenol, formaldehyde, and water, and wherein the organic solvent is selected from the group consisting of propylene glycol methyl ether acetate (PG-MEA), dipropylene glycol methyl ether acetate, diisobutyl ketone (DIBK), methyl isobutylketone, and mixtures thereof;
   azeotropically distilling the azeotropic mixture by removing water and organic solvent from the azeotropic mixture and forming an alkylphenolic resin additive from the azeotropic mixture; and
   wherein the method is performed in the absence of a solvent selected from the group consisting of benzene, toluene, ethylbenzene, xylene, mesitylene and combinations thereof.

2. The method of claim 1, wherein the method further comprises reacting the alkylphenolic resin additive with an alkylene oxide and/or a mixed oxide to form a phenolic resin oxyalkylate moiety; and wherein the azeotropically distilling comprises removing water and organic solvent therefrom and forming an alkylphenolic resin oxyalkylate additive; and wherein the alkylphenolic resin oxyalkylate additive comprises from about 30 to about 50 wt % of a phenolic resin oxyalkylate moiety compared to the total alkylphenolic resin oxyalkylate additive.

3. The method of claim 1, wherein the formed material has a molecular weight of about 2,000 g to about 10,000 g.

4. The method of claim 1, wherein the organic solvent is added to the azeotropic mixture in an amount ranging from about 20 v/v % to about 30 v/v % based on the total azeotropic mixture.

5. The method of claim 1, wherein the removing water and organic solvent from the azeotropic mixture occurs at a temperature ranging from about 100° C. to about 150° C.

6. The method of claim 1, wherein the removing water and organic solvent occurs at a pressure ranging from about 20 psig to about 50 psig.

7. The method of claim 1, wherein the amount of the organic solvent added to the azeotropic mixture ranges from about 50 v/v % to about 60 v/v % of the total azeotropic mixture.

8. A method comprising performing an azeotropic distillation in the presence of iron impurities, wherein the azeotropic distillation comprises:
   adding an organic solvent to an azeotropic mixture having iron impurities therein; wherein the azeotropic mixture comprises an alkyl phenol, formaldehyde, and water; wherein the organic solvent is selected from the group consisting of propylene glycol methyl ether acetate (PG-MEA), dipropylene glycol methyl ether acetate, diisobutyl ketone (DIBK), methyl isobutylketone, and mixtures thereof; and wherein the azeotropic mixture does not comprise an organic solvent selected from the group consisting of benzene, toluene, ethylbenzene, xylene, mesitylene, and combinations thereof; and
   azeotropically distilling the azeotropic mixture by removing water and organic solvent from the azeotropic mixture and forming an alkylphenolic resin additive from the azeotropic mixture.

9. A method comprising performing an azeotropic distillation, wherein the azeotropic distillation comprises:
   adding an organic solvent to an azeotropic mixture comprising an alkyl phenol, a formaldehyde, and water; wherein the organic solvent is selected from the group consisting of propylene glycol methyl ether acetate (PG-MEA), dipropylene glycol methyl ether acetate, diisobutyl ketone (DIBK), methyl isobutylketone, and mixtures thereof; and
   azeotropically distilling the azeotropic mixture by removing water and organic solvent from the azeotropic mixture and forming an alkylphenolic resin additive from the azeotropic mixture; and wherein the formed material comprises a phenolic resin moiety in an amount ranging from about 30 wt % to about 50 wt % of the total formed material.

* * * * *